(12) United States Patent
Nakamura et al.

(10) Patent No.: US 7,876,017 B2
(45) Date of Patent: Jan. 25, 2011

(54) COMMUTATOR AND BRUSH MATERIALS FOR SMALL ELECTRIC MOTOR, CLAD COMPOSITE MATERIAL, AND SMALL ELECTRIC DC MOTOR USING THE SAME

(75) Inventors: Keiji Nakamura, Chiba (JP); Makoto Takabatake, Chiba (JP); Masahiro Takahashi, Hiratsuka (JP); Shuichi Kubota, Hiratsuka (JP); Takao Asada, Hiratsuka (JP); Toshiya Yamamoto, Hiratsuka (JP)

(73) Assignees: Mabuchi Motor Co., Ltd., Chiba (JP); Tanaka Kikinzoku Kogyo K.K., Tokyo (JP)

( * ) Notice: Subject to any disclaimer, the term of this patent is extended or adjusted under 35 U.S.C. 154(b) by 1135 days.

(21) Appl. No.: 11/431,413

(22) Filed: May 10, 2006

(65) Prior Publication Data
US 2006/0255680 A1    Nov. 16, 2006

(30) Foreign Application Priority Data
May 12, 2005  (JP)  ............... JP2005-139423
Apr. 11, 2006  (JP)  ............... JP2006-108533

(51) Int. Cl.
*H01R 39/04* (2006.01)
*C22C 5/08* (2006.01)
*B32B 15/10* (2006.01)

(52) U.S. Cl. ............... 310/233; 428/672; 428/673; 428/929; 420/504

(58) Field of Classification Search ............... None
See application file for complete search history.

(56) References Cited

U.S. PATENT DOCUMENTS 4,141,727 A * 2/1979 Shida et al. ............... 75/232
5,236,523 A * 8/1993 Shibata ............... 148/431

(Continued)

FOREIGN PATENT DOCUMENTS

JP    54-111698    *    9/1979

(Continued)

OTHER PUBLICATIONS

Abstract for CN 1635582 A, Jul. 6, 2005.*

(Continued)

*Primary Examiner*—John J Zimmerman
(74) *Attorney, Agent, or Firm*—Roberts & Roberts, LLP

(57) ABSTRACT

An object of the present invention is to provide a commutator or brush material for a small electric DC motor which enables a lengthened operating life of a spindle motor for a DVD controlled using a pulse current. A commutator material for a small electric DC motor in accordance with the present invention is characterized by being composed of 6.0 to 10.0 wt % of Cu, 1.0 to 5.0 wt % of ZnO, and a balance of Ag and in that Cu metal particles and ZnO particles are dispersed in an AgCu matrix. A brush material for a small electric DC motor in accordance with the present invention is characterized by being composed of 0.1 to 5.0 wt % of MgO and a balance of Ag and in that MgO particles are dispersed in an Ag matrix, or is characterized by being composed of 5.0 to 15.0 wt % of Ni and a balance of Pt and in that Ni is dissolved in a Pt matrix.

5 Claims, 2 Drawing Sheets

U.S. PATENT DOCUMENTS

| | | | | |
|---|---|---|---|---|
| 5,876,862 | A * | 3/1999 | Shibuya et al. | 428/672 |
| 5,972,131 | A * | 10/1999 | Asada et al. | 148/430 |
| 6,245,166 | B1 * | 6/2001 | Shibuya et al. | 148/431 |
| 6,432,157 | B1 * | 8/2002 | Nakamura et al. | 75/232 |
| 6,638,334 | B2 * | 10/2003 | Nakamura et al. | 75/233 |
| 7,160,632 | B2 * | 1/2007 | Nakamura et al. | 428/673 |
| 7,479,862 | B2 * | 1/2009 | Mikura et al. | 336/200 |
| 2005/0116576 | A1 * | 6/2005 | Nakamura et al. | 310/233 |

FOREIGN PATENT DOCUMENTS

| | | | |
|---|---|---|---|
| JP | 58-84951 | * | 5/1983 |
| JP | 59-16219 | * | 1/1984 |
| JP | 59-59849 | * | 4/1984 |
| JP | 59-116344 | * | 7/1984 |
| JP | 59-116345 | * | 7/1984 |
| JP | 60-13038 | * | 1/1985 |
| JP | 08-291349 | | 11/1996 |

OTHER PUBLICATIONS

English translation of JP 58-084951. May 1983.*
English translation of JP 59-016219. Jan. 1984.*

* cited by examiner

COMMUTATOR AND BRUSH MATERIALS FOR SMALL ELECTRIC MOTOR, CLAD COMPOSITE MATERIAL, AND SMALL ELECTRIC DC MOTOR USING THE SAME

BACKGROUND OF THE INVENTION

1. Field of the Invention

The present invention relates to a commutator and a brush for a small electric DC motor that carries out electric switching on the basis of mechanical sliding operations, and in particular, to a commutator material and a brush material used for a small electric DC motor to rotate a DVD in a DVD player.

2. Description of the Related Art

In the above technical field, with a shift from CDs to DVDs, many studies have been made on materials for small electric DC motors which are suitable for respective applications. In initial music CD players, a disk rotated at about 500 rpm, which did not impose a heavy load on a commutator or brush material for the small electric DC motor.

CD players subsequently began to be mounted in automobiles as audio instruments. A need thus arose to make the small electric DC motor durable within the temperature range from −40 to 85° C. The applicant thus developed a commutator material for a small electric DC motor which can realize such durability (see Japanese Patent Application Laid-Open No. 8-291349).

The commutator material for a small electric DC motor disclosed in Japanese Patent Application Laid-Open No. 8-291349 can adjust to the increased rotation speeds of CD players such as a double speed and a quadruple speed and to playback-only DVD players. This commutator material is now typical for spindle motors.

However, a method for controlling a spindle motor for a DVD has further been complicated. Consequently, the commutator material for a small electric DC motor described in Japanese Patent Application Laid-Open No. 8-291349 may fail to meet the requirements for the characteristics of the material. Thus, a further improvement in the performance of the material is now demanded. Further, for a further improvement in performance, it is now desirable to develop not only a commutator material for a small electric DC motor but also a brush material used in combination with the commutator material.

In recent years, several schemes for controlling a spindle motor for a DVD have been known. For example, high-grade audio instruments use a pulse current to control the rotational frequency of the motor. However, it has been pointed out that the commutator material for a small electric DC motor described in Japanese Patent Application Laid-Open No. 8-291349 may fail to meet the demand characteristics of the material.

The present invention is made under these circumstances. It is an object of the present invention to provide a commutator material and a brush material for a small electric DC motor which enable a lengthened operating life of a spindle motor for a DVD which is controlled by a pulse current.

SUMMARY OF THE INVENTION

To solve the above problem, the present inventor et al. have devoted themselves to relevant studies to obtain the present invention. The present invention provides a commutator material for a small electric DC motor, comprising a composition of 6.0 to 10.0 wt % of Cu, 1.0 to 5.0 wt % of ZnO, and a balance of Ag and wherein Cu metal particles and ZnO particles are dispersed in an AgCu alloy matrix.

The commutator material for a small electric DC motor in accordance with the present invention is characterized in that Cu metal particles and ZnO particles are dispersed in an AgCu alloy matrix. The Cu dissolved in and the Cu particles dispersed in the matrix of the AgCu alloy contribute to improving wear resistance. The ZnO particles dispersed in the AgCu matrix reduce exhaustion caused by an arc and serve as a lubricant for a sliding part of a brush composed of this material. This reduces frictional resistance.

A conventional commutator material for a small electric DC motor, for example, an Ag—Pd—Cu—Ni alloy, is manufactured via what is called a dissolution method. Cu and Ni metal particles are dispersed in the alloy matrix to suppress wear. On the other hand, in the commutator material for a small electric DC motor in accordance with the present invention, Cu metal particles and ZnO particles are dispersed in an AgCu alloy matrix. The dispersion of both metal and oxide particles makes it possible to provide the commutator material for a small electric DC motor with a very high wear resistance.

As in the commutator material for a small electric DC motor in accordance with the present invention, the ZnO particles can be dispersed in the AgCu alloy matrix by using what is called a powder metallurgy process to manufacture a commutator material. The powder metallurgy process very uniformly disperses the oxide particles present in the Ag matrix. However, the dissolution method does not enable the manufacture of a commutator material for a small electric DC motor which has the same structure as that in accordance with the present invention.

In the commutator material for a small electric DC motor in accordance with the present invention, the Cu and Cu metal particles dissolved in the AgCu alloy matrix mainly serve to improve the wear resistance of the commutator material for a small electric DC motor. The content of Cu is desirably 6.0 to 10.0 wt %. A content of less than 6.0 wt % reduces the effects of enhancing the matrix by the formation of an AgCu alloy and improving the wear resistance using the Cu metal particles. At a content of more than 10.0 wt %, the improved wear resistance exerts an adverse effect, that is, the brush, used in combination with the commutator, is worn. This reduces the durable lifetime of the small electric DC motor. By setting the content of Cu within the range from 7.0 to 9.0 wt %, it is possible to provide the most excellent characteristics for the commutator material for a small electric DC motor in accordance with the present invention. The commutator material is thus very suitable in a practical sense.

In the commutator material for a small electric DC motor in accordance with the present invention, the ZnO particles act as a solid phase lubricant in a sliding part, that is, on a contact surface. The content of ZnO is desirably 1.0 to 5.0 wt %. The ZnO particles tend not to function as a lubricant when the content of ZnO is less than 1.0 wt %. A content of more than 5.0 wt % lowers machinability and makes it difficult to machine the material into a commutator for a small electric DC motor. Setting the content of ZnO within the range from 2.0 to 4.0 wt % makes the sliding contact characteristic the more excellent. This is very suitable in a practical sense.

When the commutator material for a small electric DC motor in accordance with the present invention is used as a commutator for a motor, then as a more suitable component of the commutator, a clad composite material preferably comprises a base material of Cu or Cu alloy and the commutator material for a small electric DC motor in accordance with the present invention embedded in a part of the base material.

This improves, for example, solderability if the commutator is electrically connected to an external device and also improves machinability when the material is molded into a shape with a higher circularity required for the commutator. The use of the clad composite material enables the thickness of the commutator material for a small electric DC motor in accordance with the present invention embedded in the base material to be controlled depending on the small electric DC motor used. Consequently, an expensive commutator material for a small electric DC motor can be used only for an appropriate portion. This is economically suitable.

For a clad composite material using a base material of Cu or CU alloy, a part of a embedded commutator material for a small electric DC motor which is exposed from the surface is exposed to the air and thus tends to be sulfidized. Thus, for the clad composite material having the commutator material for a small electric DC motor in accordance with the present invention embedded in a part of the base material of Cu or Cu alloy, it is further desirable that the embedded commutator material for a small electric DC motor be at least partly coated with Au or Au alloy. The Au or Au alloy is known as a good commutator material which has a high corrosion resistance and which can offer a low contact resistance. However, the Au or Au alloy is very expensive, and the use of a large amount of Au or Au alloy is economically disadvantageous. The Au or Au alloy is thus coated only on a part of the appropriate portion, thus suppressing an increase in cost and effectively preventing sulfidization of the commutator material for a small electric DC motor in accordance with the present invention. When such a clad composite material is used for a commutator in a small electric DC motor, the excellent contact resistance characteristic of the Au or Au alloy enables the motor to be initially driven successfully. Even if the Au or Au alloy is destroyed by wear, the motor can be continuously used owing to the commutator material for a small electric DC motor in accordance with the present invention, which is present inside the Au or Au alloy.

If what is called a two- or three-layer clad composite material in accordance with the present invention is used for a commutator in a spindle motor for a DVD, the small electric DC motor can last significantly longer.

In developing the commutator material, used for small electric DC motors, the present inventor et al. studied a brush material used in combination with the commutator material. As a result, the present inventor et al. have found two types of brush materials suitable for small electric DC motors.

A first brush material for a small electric DC motor in accordance with the present invention is characterized by comprising a composition of 0.1 to 5.0 wt % of MgO and a balance of Ag and in that MgO particles are dispersed in an Ag matrix.

Another brush material for a small electric DC motor in accordance with the present invention is characterized by comprising a composition of 5.0 to 15.0 wt % of Ni and a balance of Pt and in that Ni is dissolved in a Pt matrix.

In the brush material for a small electric DC motor in accordance with the present invention in which the MgO particles are dispersed in the Ag matrix, the MgO particles dispersed in the Ag matrix reduce exhaustion caused by an arc and serve as a lubricant for a sliding part of a brush composed of this material. This reduces frictional resistance.

In the commutator material for a small electric DC motor in accordance with the present invention in which the MgO particles are dispersed in the Ag matrix, the MgO particles act as a solid phase lubricant in a sliding part, that is, on a contact surface. The content of MgO is desirably 0.1 to 5.0 wt %. The MgO particles tend not to function as a lubricant when the content of MgO is less than 0.1 wt %. A content of more than 5.0 wt % lowers machinability and makes it difficult to machine the material into a commutator for a small electric DC motor. Setting the content of MgO within the range from 1.5 to 4.0 wt % makes the sliding contact characteristic the most excellent. This is very suitable in a practical sense.

By using what is called the powder metallurgy process to manufacture a brush material, it is possible to obtain the commutator material for a small electric DC motor in accordance with the present invention in which the MgO particles are dispersed in the Ag matrix. The powder metallurgy process very uniformly disperses the oxide particles present in the Ag matrix. However, such a particle dispersion type material cannot be formed, by what is called the dissolution method, described later, into a brush material for a small electric DC motor which has the same structure as that in accordance with the present invention.

Another brush material for a small electric DC motor in accordance with the present invention is an alloy comprising Ni dissolved in a Pt matrix. Although the Pt metal is originally resistant to exhaustion caused by an arc, dissolution of Ni in the Pt matrix smoothens the surface of the brush. In other words, the dissolved Ni serves as a lubricant for a sliding part of a brush composed of this material. This reduces frictional resistance.

In the brush material for a small electric DC motor in accordance with the present invention which comprises the alloy having Ni dissolved in the Pt matrix, the dissolved metal Ni improves the lubricity of Pt. The content of Ni is desirably 5.0 to 15.0 wt %. Ni tends not to improve the lubricity when the content of Ni is less than 5.0 wt %. A content of more than 15.0 wt % causes Ni to be oxidized and the resulting nickel oxide offers an increased contact resistance. Setting the content of Ni within the range from 8.0 to 12.0 wt % makes the sliding contact characteristic the most excellent. This is very suitable in a practical sense.

What is called the dissolution method can be used to manufacture the brush material for a small electric DC motor in accordance with the present invention which comprises the alloy having Ni dissolved in the Pt matrix. Well-known brush materials for small electric DC motors are manufactured by what is called the dissolution method, for example, an Ag 50 wt %-Pd 50 wt % alloy is formed into an AgPd-dissolved alloy by the dissolution method to suppress possible wear. As is the case with the Ag 50 wt %-Pd 50 wt % alloy, the dissolution method can be used to manufacture the brush material for a small electric DC motor in accordance with the present invention which comprises the alloy having Ni dissolved in the Pt matrix. Dissolution of the Ni metal in the Pt matrix enables the improvement of both the resistance to exhaustion caused by an arc and the lubricity. The resulting brush material for a small electric DC motor offers a very favorable wear resistance.

If the brush material for a small electric DC motor in accordance with the present invention is used as a brush for a motor, then as a more suitable component of the brush, a clad composite material preferably comprises a base material of a Cu alloy having spring characteristics and the brush material for a small electric DC motor in accordance with the present invention embedded in a part of the base material. This enables the brush to contact a commutator under an optimum load utilizing the spring characteristics of the base material. The use of the clad composite material enables the thickness of the brush material for a small electric DC motor in accordance with the present invention embedded in the base material to be controlled depending on the small electric DC motor used. Consequently, an expensive brush material for a small electric DC motor can be used only for an appropriate portion. This is economically suitable.

Studies by the present inventor et al. indicate that a reduced contact resistance characteristic, a reduced starting voltage characteristic, and the like can be reliably achieved by applying a combination of the commutator and brush materials for a small electric DC motor in accordance with the present invention to a DC small-sized spindle motor used in a DVD player.

As described above, when the commutator or brush material for a small electric DC motor in accordance with the present invention or their combination is applied to a DC small-sized spindle motor used in a DVD player, a reduced contact resistance can be maintained over time, and the motor can be driven for a long time with a reduced starting voltage. The present invention can therefore allow the small electric DC motor to last longer than the conventional commutator or brush material.

DETAILED DESCRIPTION OF THE PREFERRED EMBODIMENTS

Figure 1:
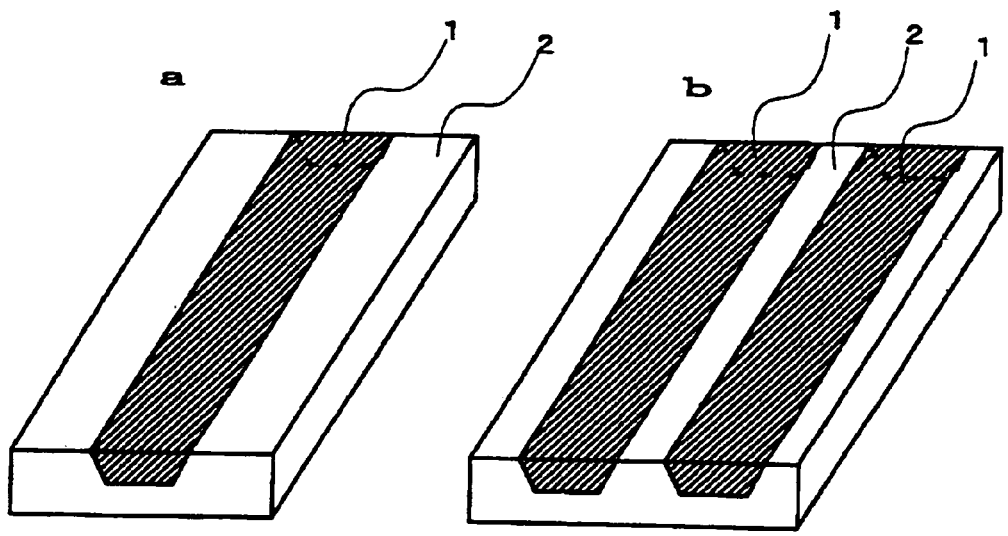
FIG. 1 is a perspective view of a two-layer clad composite material.

A preferred embodiment of the present invention will be described below on the basis of examples and conventional examples described below. First, description will be given of evaluation of abrasiveness for the commutator and brush materials for a small electric DC motor in accordance with the present invention. Table 1 shows the composition of Example 1 of the commutator material for a small electric DC motor in accordance with the present invention and the composition of Conventional Example 1 compared with Example 1 for characteristics.

TABLE 1

| Example 1 | | |
|---|---|---|
| Cu | ZnO | Ag |
| 8.0 | 3.0 | Balance |

| Conventional Example 1 | | | |
|---|---|---|---|
| Pd | Cu | Ni | Ag |
| 0.5 | 8.0 | 0.5 | Balance |

(wt %)

The commutator material for a small electric DC motor in Example 1 was manufactured as described below. First, 8.0 wt % of Cu powder, 3.0 wt % of ZnO powder, and a balance of Ag powder were agitated in a ball mill for four hours to obtain a powder mixture in which the powders were uniformly dispersed. The powder mixture was filled into a cylindrical container, which was then compressed by exerting a pressure of $4.9 \times 10^5$ N (50 tf) to the cylinder from its longitudinal direction. A cylindrical billet of diameter 50 mm was thus formed. The cylindrical billet was sintered at a temperature of 973 K (700° C.) for four hours (5.0 Pa). After the compression process, the sintering process was repeated three times.

The compressed and vacuum-sintered cylindrical billet was formed into a wire of diameter 6.0 mm by hot extrusion. The wire was subsequently drawn to a diameter of 1.6 mm.

The commutator material for a small electric DC motor in Conventional Example 1 was manufactured by the dissolution method. The metals were dissolved so as to obtain the composition shown in Table 1 and then cast, extruded, and drawn to obtain a wire of diameter 1.6 mm. Japanese Patent Application Laid-Open No. 8-291349 discloses in detail a method of manufacturing the commutator material for a small electric DC motor in Conventional Example 1.

Each wire formed as described above was shaped into a tape via a roller, which was then inlaid with a Cu material constituting a base layer to obtain a clad composite material. The clad composite material was thermally treated at 1023 K (750° C.) and repeatedly rolled to obtain a two-layer clad composite material of total thickness 0.3 mm and width 19 mm.

Figure 2:
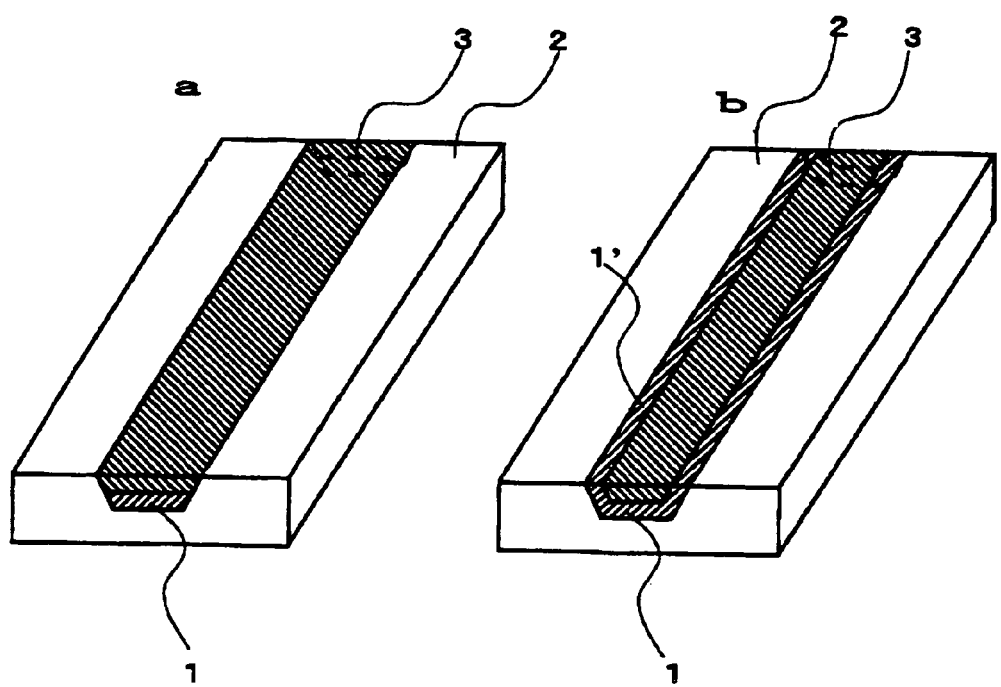
FIG. 2 is a perspective view of a three-layer clad composite material.

Now, description will be given of the configuration of the clad composite material in accordance with the present invention. The perspective view in FIG. 1 shows what is called a two-layer clad composite material in which the commutator material for a small electric DC motor shown in the present embodiment is embedded in a part of a base material consisting of Cu alloy. The perspective view in FIG. 2 shows what is called a three-layer clad composite material in which the commutator material for a small electric DC motor shown in the present embodiment is embedded in a part of a base material consisting of Cu alloy and is further partly coated with Au or Au alloy. FIGS. 1A, 2A, and 2B show a single-stripe clad composite material, and FIG. 1b shows a two-stripe clad composite material. In the figures, reference numeral 1 denotes a commutator material for a small electric DC motor in accordance with the present invention. In FIG. 2, reference numeral 1' denotes an exposed portion of the embedded commutator materiel 1 for a small electric DC motor. Reference numeral 2 denotes the base material of Cu alloy and reference numeral 3 denotes Au or Au alloy.

Subsequently, description will be given of brush materials used in combination with commutators used when the commutator materials in Example 1 and Conventional Example 1 were evaluated for wear characteristics. Table 2 shows the compositions of the brush materials for a small electric DC motor.

TABLE 2

| Example 2 | |
|---|---|
| MgO | Ag |
| 2.3 | Balance |

| Example 3 | |
|---|---|
| MgO | Ag |
| 3.3 | Balance |

| Example 4 | |
|---|---|
| Ni | Pt |
| 10.0 | Balance |

TABLE 2-continued

Conventional Example 2

| Pd | Ag |
|---|---|
| 50.0 | Balance |

(wt %)

Description will be given below of a method of manufacturing a brush using each of the brush materials for a small electric DC motor shown in Table 2. In Examples 2 and 3, an appropriate amount of MgO powder and a remaining amount of Ag powder corresponding to each composition were agitated in a ball mill for four hours to obtain a powder mixture in which the powders were uniformly dispersed. The powder mixture was filled into a cylindrical container, which was then compressed under pressure of $4.9 \times 10^5$ N (50 tf) to the cylinder from its longitudinal direction. A cylindrical billet of diameter 50 mm was thus formed. The cylindrical billet was sintered at a temperature of 1123 K (850° C.) for four hours (5.0 Pa). After the compression process, the sintering process was repeated three times.

The compressed and vacuum-sintered cylindrical billet was formed into a wire of diameter 6.0 mm by hot extrusion. The wire was subsequently drawn to a diameter of 1.0 mm.

Now, description will be given below of a method of manufacturing a brush using each of the brush materials for a small electric DC motor in Example 4 and Conventional Example 2 shown in Table 2. For the brush materials in Example 4 and Conventional Example 2, the dissolution method was used to dissolve the metals so as to obtain the corresponding composition shown in Table 2. The solution was then cast, extruded, and drawn to obtain a wire of diameter 1.0 mm.

Each wire formed as described above was shaped into a tape via a roller. The tape was then inlaid with a Cu material constituting a base layer to obtain a clad composite material. The clad composite material was thermally treated at 1073 K (800° C.) and repeatedly rolled to obtain a two-layer clad composite material of total thickness 70 μmm and width 19 mm. This two-layer clad composite material is configured similarly to that shown in FIG. 1; the brush material for a small electric DC motor shown in the present embodiment is embedded in a part of the base material consisting of Cu alloy. For this two-layer clad composite material for a brush, reference numeral 1 in FIG. 1 denotes the brush material for a small electric DC motor shown in Table 2. In FIG. 2, reference numeral 1' denotes an exposed portion of the embedded brush materiel 1 for a small electric DC motor. Reference numeral 2 denotes the base material of Cu alloy.

Figure 3:
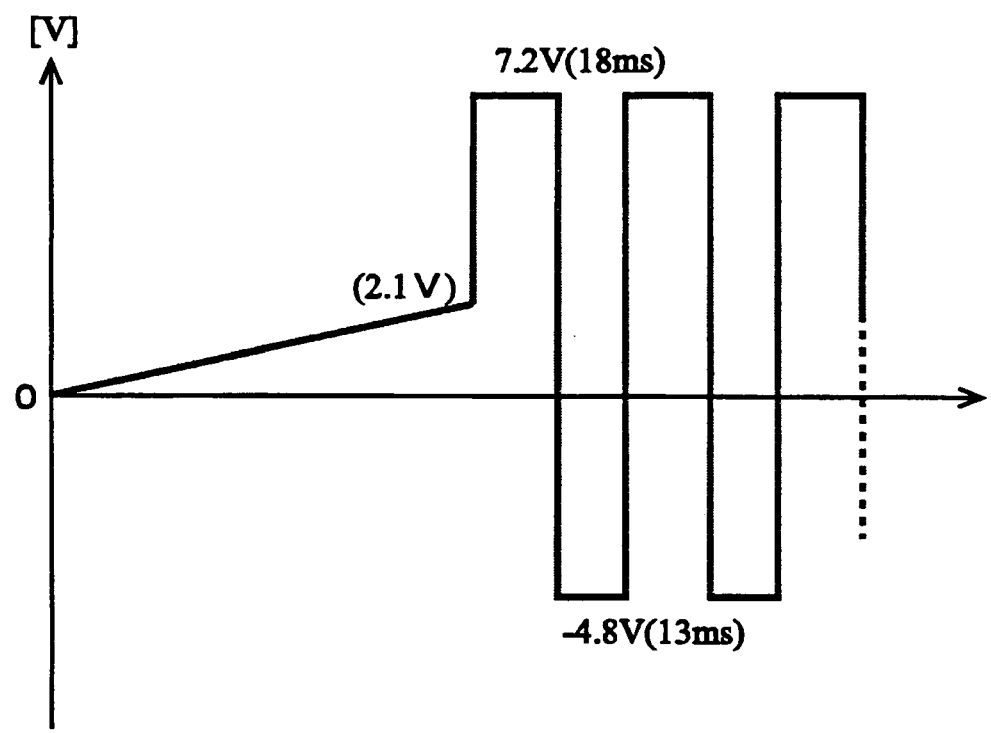
FIG. 3 is a schematic diagram of waveform of pulse control.

The commutator and brush composed of the two-layer clad composite material were used to actually assemble a small electric DC motor. Then, the motor was driven for a predetermined time and then checked for the wear of the commutator and brush. The commutator material for a small electric DC motor having each of the compositions shown in Table 1 was used to produce the two-layer clad composite material shown in FIG. 1A. The clad material was then machined into a three-pole commutator of outer diameter 3.3 mm and length 2.4 mm, which was then incorporated into a small electric DC motor for a DVD spindle. The brush material for a small electric DC motor having each of the compositions shown in Table 2 was used to produce the two-layer clad composite material shown in FIG. 1A. The clad material was then shaped into a three-forked brush, which was then incorporated into a small electric DC motor for a DVD spindle. Conditions for comparison tests are shown in Table 3. FIG. 3 shows the waveform of pulse control performed.

TABLE 3

| Control | Pulse control |
|---|---|
| Maximum voltage | 7.2 V |
| Rotational frequency of the motor | 1800 rpm |
| Load | 12-cm DVD |
| Number of motors tested | 5 units |
| Environment | 60° C., no humidity control |
| Test time | 200 hours |

Small electric DC motors each having a combination of the commutator and brush materials shown in Table 4 were evaluated for abrasiveness. Test temperature was 60° C. and five small electric DC motors each having the corresponding combination were rotated for 200 hours using a 12-cm DVD as a load. The commutators and brushes in the five motors 10 were subsequently measured for wear depth, with the measured values averaged. The results are shown in Table 4.

TABLE 4

| Commutator | Brush | Wear depth of center of the commutator | Wear depth of slit portion of the commutator | Wear depth of the plus pole brush | Wear depth of the minus pole brush |
|---|---|---|---|---|---|
| Example 1 | Example 4 | 9 | 19 | 3 | 1 |
| Example 1 | Conventional Example 2 | 10 | 15 | 9 | 5 |
| Conventional Example 1 | Example 4 | 20 | 38 | 4 | 2 |
| Conventional Example 1 | Conventional Example 2 | 31 | 48 | 31 | 27 |

(μm)

As Table 4 shows, it was revealed the motor having the combination of the commutator material in Example 1 and the brush material in Example 4 has substantially smaller commutator and brush wear depths than the motor having the combination of the commutator material in Conventional Example 1 and the brush material in Conventional Example 2. Even a motor in which either the commutator or brush material has the composition in accordance with the present invention has smaller commutator and brush wear depths than a motor having a combination of the commutator material in Conventional Example 1 and the brush material in Conventional Example 2. The pulse control of a small electric DC motor for a DVD spindle normally frequently applies a rotation control voltage to the motor. This generates a rush current the value of which is 10 times as large as a rated one. The resulting sparks melt and wear a commutation switching portion of a commutator piece, thus increasing the amount of material transfer to the brush. This results in marked adhesive wear. Such an adhesive wear phenomenon is significant in the motor having the combination of the commutator material in Conventional Example 1 and the brush material in Conventional Example 2. However, the wear phenomenon was suppressed in the motors having the other combinations.

Now, description will be given of durability tests on small electric DC motors using the commutator and brush materials shown in Tables 1 and 2.

The conditions for the durability tests were the same as those shown in Table 3 except the test time. The waveform of pulse control was also similar to that shown in FIG. 3. The durability tests were conducted on five small electric DC motors assembled using the combinations of the commutator and brush materials shown in Table 5. The durability tests involved the measurement of the time when each motor failed. However, for a motor the durable lifetime of which exceeded 1,300 hours, the tests were stopped at that point and the durable time for this motor was determined to be 1,300 hours.

TABLE 5

| Commutator | Brush | First motor | Second motor | Third motor | Fourth motor | Fifth motor |
| --- | --- | --- | --- | --- | --- | --- |
| Example 1 | Example 2 | 760 | 1010 | 1140 | 1178 | 1200 |
| Example 1 | Example 3 | 1010 | 1280 | 1300 | 1300 | 1300 |
| Example 1 | Example 4 | 1008 | 1029 | 1300 | 1300 | 1300 |
| Example 1 | Conventional Example 2 | 775 | 818 | 914 | 928 | 1062 |
| Conventional Example 1 | Example 4 | 596 | 768 | 771 | 813 | 990 |

TABLE 5-continued

| Commutator | Brush | First motor | Second motor | Third motor | Fourth motor | Fifth motor |
| --- | --- | --- | --- | --- | --- | --- |
| Conventional Example 1 | Conventional Example 2 | 429 | 440 | 487 | 508 | 536 |

(time)

As shown in Table 5, for the combination of the commutator material in Example 1 and each of the brush materials in Examples 2 to 4, all five motors lasted at least 1,000 hours. This meets the requirements of the market.

What is claimed is:

1. A commutator material for a small electric DC motor for a spindle, consisting of a composition of 6.0 to 10.0 wt % of Cu, 1.0 to 5.0 wt % of ZnO, and a balance of Ag, wherein Cu metal particles and ZnO particles are dispersed in an AgCu alloy matrix.

2. A clad composite material comprising the commutator material for a small electric DC motor for a spindle defined in claim 1, which is embedded in a part of a base material of Cu or Cu alloy.

3. The clad composite material according to claim 2, wherein the embedded small electric DC motor commutator material is at least partly coated with Au or Au alloy.

4. A small electric DC motor for a spindle comprising a commutator, wherein the commutator comprises the clad composite material defined in claim 2.

5. A small electric DC motor for a spindle comprising a commutator, wherein the commutator comprises the clad composite material defined in claim 3.

\* \* \* \* \*